US009894884B2

(12) United States Patent
Hill et al.

(10) Patent No.: US 9,894,884 B2
(45) Date of Patent: Feb. 20, 2018

(54) COMPANION ANIMAL HEALTH MONITORING SYSTEM

(71) Applicant: Allflex USA, Inc., DFW Airport, TX (US)

(72) Inventors: Nicholas Hill, DFW Airport, TX (US); Johan De Meulemeester, Vitre (FR); Brian Bolton, DFW Airport, TX (US); Robert Stewart, Mancos, CO (US)

(73) Assignee: Allflex USA, Inc., DFW Airport, TX (US)

( * ) Notice: Subject to any disclaimer, the term of this patent is extended or adjusted under 35 U.S.C. 154(b) by 0 days.

(21) Appl. No.: 14/932,212

(22) Filed: Nov. 4, 2015

(65) Prior Publication Data
US 2016/0120154 A1    May 5, 2016

Related U.S. Application Data

(60) Provisional application No. 62/075,745, filed on Nov. 5, 2014.

(51) Int. Cl.
*A01K 29/00* (2006.01)
*G08C 17/02* (2006.01)
(Continued)

(52) U.S. Cl.
CPC .......... *A01K 29/005* (2013.01); *A01K 11/008* (2013.01); *G08C 17/02* (2013.01);
(Continued)

(58) Field of Classification Search
CPC ........... A61B 5/00; A61B 5/01; A61B 5/0031; G08B 23/00; G08B 1/08; A01K 29/005;
(Continued)

(56) References Cited

U.S. PATENT DOCUMENTS

| 5,252,962 A * | 10/1993 | Urbas | A61B 5/0008 128/903 |
| 6,283,065 B1 * | 9/2001 | Shorrock | A01K 27/009 119/859 |

(Continued)

FOREIGN PATENT DOCUMENTS

| WO | 2016073754 | 5/2016 |
| WO | 2016073754 A1 | 5/2016 |

OTHER PUBLICATIONS

International Search Report and Written Opinion for International Application No. PCT/US2015/059292, Search completed Dec. 22, 2015, dated Mar. 2, 2016, 9 Pgs.
(Continued)

*Primary Examiner* — Hung T Nguyen
(74) *Attorney, Agent, or Firm* — KPPB LLP

(57) ABSTRACT

Systems and methods for companion animal health monitoring are described. In one embodiment, an animal health monitoring system including an electronic assembly located on a companion animal including a microprocessor, a power source connected to the microprocessor, and a transceiver and a microchip implanted in the companion animal and including memory storing identification data and a temperature sensor measuring the temperature of the companion animal, wherein the electronic assembly interrogates the microchip to obtain identification data and temperature data and transmits the identification data and the temperature data.

20 Claims, 3 Drawing Sheets

(51) Int. Cl.
 *H04Q 9/00* (2006.01)
 *A01K 11/00* (2006.01)
(52) U.S. Cl.
 CPC ........... *H04Q 9/00* (2013.01); *H04Q 2209/47* (2013.01); *H04Q 2209/50* (2013.01)
(58) Field of Classification Search
 CPC ....... A01K 11/008; G06K 2007/10504; G06K 2009/84; G06K 19/0707; G08C 17/02; H04Q 2209/47
 USPC ..... 340/573.1, 573.3, 539.1, 539.11, 539.13; 600/300, 301, 549; 119/859, 863
 See application file for complete search history.

(56) References Cited

U.S. PATENT DOCUMENTS

| | | |
|---|---|---|
| 8,219,053 B2 | 7/2012 | Mejia et al. |
| 2002/0010390 A1 | 1/2002 | Guice et al. |
| 2004/0155782 A1* | 8/2004 | Letkomiller ......... A01K 11/006 340/573.3 |
| 2006/0202818 A1 | 9/2006 | Greenberg |
| 2008/0036610 A1* | 2/2008 | Hokuf .................. A01K 11/008 340/573.3 |
| 2011/0001610 A1 | 1/2011 | Stevenson et al. |
| 2012/0299731 A1 | 11/2012 | Triener |
| 2014/0336524 A1* | 11/2014 | Stewart ................ A61B 5/0015 600/549 |

OTHER PUBLICATIONS

International Preliminary Report on Patentability for International Application No. PCT/U52015/059292, Search completed May 9, 2017, dated May 18, 2017, 8 pages.

International Search Report and Written Opinion for International Application No. PCT/US2015/059292, Search completed Dec. 22, 2015, dated Mar. 2, 2016, 9 pages.

* cited by examiner

COMPANION ANIMAL HEALTH MONITORING SYSTEM

CROSS-REFERENCE TO RELATED APPLICATIONS

The instant application claims priority to U.S. Provisional Patent Application No. 62/075,745, titled "Companion Animal Health Monitoring System" and filed Nov. 5, 2014, the disclosure of which is hereby incorporated by reference in its entirety.

FIELD OF INVENTION

This invention relates to the use of radio frequency identification and specifically to short range radio frequency communications applied to the remote monitoring of animal physiological data for the purpose of assessing animal health and welfare.

BACKGROUND

Radio Frequency Identification (RFID) is an established technology that has been deployed in animal identification applications for nearly three decades. While initially promoted as a lost animal retrieval means, RFID has more recently been promoted as a means of identification associated with animal health insurance products. More recent advances in microchip technology have resulted in the inclusion of physiological sensors, such as a temperature sensor, in the transponder. Typical of such a device is the Destron BioThermo® transponder, manufactured by Destron-Fearing Corporation of Eagan, Minn.

SUMMARY OF THE INVENTION

Systems and methods for companion animal health monitoring are described. In one embodiment, an animal health monitoring system including an electronic assembly located on a companion animal including a microprocessor, a power source connected to the microprocessor, and a transceiver and a microchip implanted in the companion animal and including memory storing identification data and a temperature sensor measuring the temperature of the companion animal, wherein the electronic assembly interrogates the microchip to obtain identification data and temperature data and transmits the identification data and the temperature data.

In another embodiment of the invention, the power source includes a battery.

In an additional embodiment of the invention, the electronic assembly transmits the identification data and the temperature data to a cellular telephone.

In yet another additional embodiment of the invention, the electronic assembly transmits the identification data and the temperature data in response to a request received from the cellular telephone.

In still another additional embodiment of the invention, the electronic assembly transmits the identification data and the temperature data based on a pre-determined schedule.

In yet still another additional embodiment of the invention, the electronic assembly further includes an RFID transceiver and the electronic assembly interrogates the microchip using the RFID transceiver.

In yet another embodiment of the invention, the electronic assembly dynamically adjusts a resonance capacitance of an antenna based on a frequency for interrogating the microchip using the RFID transceiver.

In still another embodiment of the invention, the electronic assembly further includes a memory and the electronic assembly stores the obtained data using the memory.

In yet still another embodiment of the invention, the electronic assembly further includes a real time clock capable of determining time data.

In yet another additional embodiment of the invention, the electronic assembly further obtains time data using the real time clock and transmits the time data.

In still another additional embodiment of the invention, the electronic assembly further transmits the data based on the time data obtained using the real time clock.

In yet still another additional embodiment of the invention, the electronic assembly is integrated into a collar worn by the animal.

In yet another embodiment of the invention, the electronic assembly further includes a Global Positioning System (GPS) receiver capable of generating location data and the electronic assembly further transmits the location data.

In still another embodiment of the invention, the electronic assembly further includes an environmental temperature sensor and the electronic assembly further obtains environmental temperature data using the environmental temperature sensor and transmits the environmental temperature data.

In yet still another embodiment of the invention, the electronic assembly is further connected to an antenna.

In yet another additional embodiment of the invention, the antenna is integrated into a collar worn by the companion animal and the electronic assembly includes a connector that connects to the antenna.

In still another additional embodiment of the invention, the antenna includes a ferrite core solenoid-form antenna.

In yet still another additional embodiment of the invention, the microchip is implanted in the animal such that it is located within a threshold distance from the antenna when the collar is fitted on the companion animal.

In yet another embodiment of the invention, the electronic assembly transmits the data using a Bluetooth connection.

In still another embodiment of the invention, the electronic assembly transmits the data using a cellular connection.

DETAILED DESCRIPTION OF THE INVENTION

Turning now to the drawings, systems and methods for companion animal health monitoring are disclosed. Such companion animal identification systems can include a small glass encapsulated passive transponder ("microchip"), typically measuring 12 mm long by 2 mm in diameter, that is easily and quickly implanted using a hollow point needle. The microchip can be activated and scanned for its internally stored unique identification code by a reader device. The temperature sensing microchip is physically identical to a conventional identification microchip and can include a temperature sensor. The microchips can transmit identification and temperature data when activated, either automatically or in response to a scan tool utilized to read the microchip. Identification and temperature scanning is useful to animal healthcare specialists and can also be informative to pet owners as a means to monitor animal health and welfare.

Companion Animal Health Monitoring Systems

Figure 1:
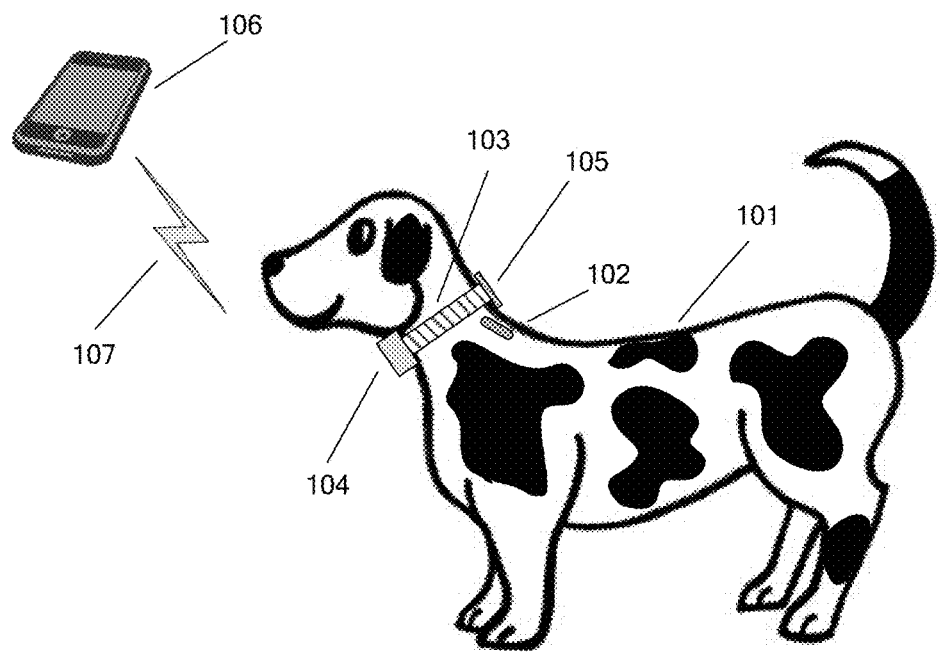
FIG. 1 is a conceptual illustration of a typical companion animal exemplar in accordance with an embodiment of the invention.

FIG. 1 illustrates a typical companion animal exemplar, which for the purposes of describing the present invention is a canine 101, hereinafter referred to as "Roscoe". Roscoe possesses a temperature sensing microchip 102 injected within his body, preferably at a location that is medial to his scapulae (shoulder blades), and well into subcutaneous tissue where it will resist migration. Roscoe also possesses a collar 103 which can be equipped with a microchip scanner for the purpose of periodically capturing identification and temperature data from the microchip. Specifically, there can be mounted on the collar 103 a scanning antenna 105 and an electronic assembly 104 which together constitute the microchip scanner. While antenna 105 and electronic assembly 104 could be attached to a conventional dog collar, a custom collar into which this cable is integrally structured, and is thereby protected, is preferred. For example, the cable can be sewn and/or molded into the material of the collar. However, any variety of construction for connecting the antenna and electronic assembly, including wireless connections, can be utilized as appropriate to the requirements of specific applications of embodiments of the invention. Antenna 105 can be constructed as a loop antenna including a multitude of turns of an electrical conductor embedded circumferentially in the dog collar 103. An antenna of this type can include an electrical connector (not shown) that permits the collar to be separated and joined for attachment purposes. In several embodiments, the electronic assembly 104 includes a transformer (not shown) that can be used to connect to the antenna 105. In this way, a simple connector can be utilized to connect to the antenna. In a number of embodiments, the electronic assembly 104 is inductively coupled to the antenna 105. This arrangement can permit the collar and electronic assembly to be separate physical packages so that a single electronic assembly could be paired with any of several alternate collar sizes or designs. A preferred embodiment for antenna 105 includes a ferrite core solenoid-form antenna located at the top of the collar 103 nearby the implanted microchip 102. The physical weight of the electronic assembly 104 can maintain the antenna's position near microchip 102. In many embodiments, the electronic assembly 104 is attached to the collar 103 via any of a variety of connectors, such as buttons, snaps, hook-and-loop fasteners, or any other connector as appropriate to the requirements of specific applications of embodiments of the invention. In a number of embodiments, the collar 103 includes a strain-relief device that can be utilized to reduce the strain on the antenna.

In several embodiments, the collar 103 is designed to automatically resize itself to the size of the companion animal. The collar can be manufactured from an elastic material and/or include a reel for drawing up excess collar material as appropriate to the requirements of specific applications of embodiments of the invention. Additionally, harnesses are often more stable than collars and tend to be located between the head and just behind the front legs of the companion animal. In a variety of embodiments, the collar 103 is a harness that includes a variety of straps, bands, and/or other panels of material that can be attached to secure the harness to Roscoe. The electronic assembly 104 can then be attached anywhere on the harness, including locations that are closer to the implanted microchip than are possible with a standard collar.

Figure 4:
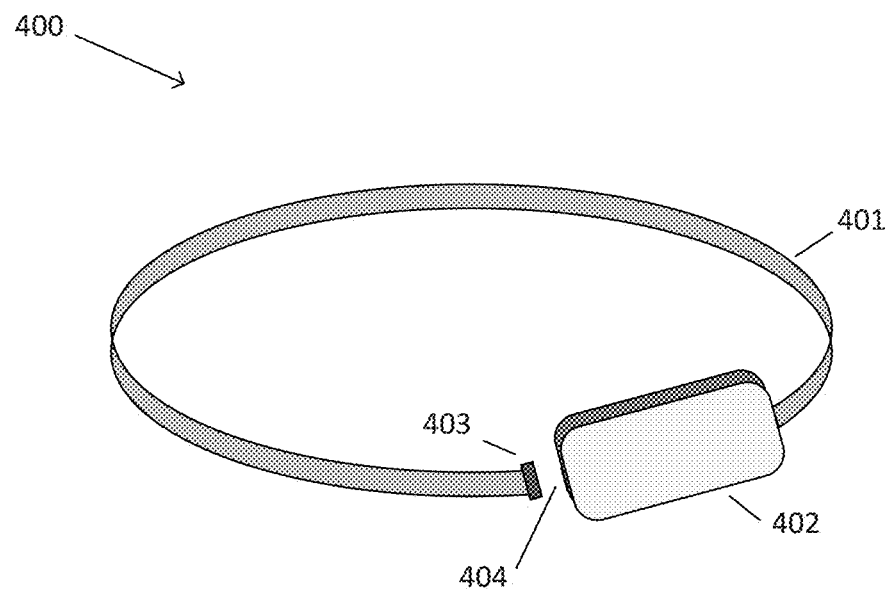
FIG. 4 is a conceptual illustration of a collar in accordance with an embodiment of the invention.

Turning now to FIG. 4, a conceptual illustration of a collar that can be worn by a companion animal is shown. The collar assembly 400 includes a collar strap 401. In a variety of embodiments, the collar strap 401 contains an embedded antenna. Electronic assembly 402 can be attached to the collar strap and includes a receptacle 404. The collar strap further includes a connector plug 403, connected to the embedded antenna, which can be mated with the receptacle 404 to connect the embedded antenna to the electronic assembly. The antenna, connector plug, and/or receptacle can be single-conductor and/or multi-conductor as appropriate to the requirements of specific applications of embodiments of the invention. Further, the connection between the connector plug and receptacle can be direct and/or wireless, such as an inductive connection, as appropriate to the requirements of specific applications of embodiments of the invention. In many embodiments, the receptacle 404 includes multi-pole connector to that, when connected to the connector plug 403, completes a multi-turn antenna embedded in the collar strap 401.

Returning to FIG. 1, electronic assembly 104 can be contained within a hermetically sealed enclosure containing components and circuitry that perform functions to be described in detail to follow. The electronic assembly 104 can periodically self-activates, captures identification and temperature data from the microchip 102, and conveys this information wirelessly 107 to a nearby device such a smartphone 106 equipped with a compatible wireless radio and a user application. The self-activation time period can be pre-determined and/or determined dynamically as appropriate to the requirements of specific applications of embodiments of the invention. Wireless connectivity 107 between the electronic assembly 104 and smartphone device 106 preferably include a Bluetooth technology short range radio, but could alternately include a Wi-Fi connection, a near-field communication (NFC) radio, a cellular telephone connection, (SMS, e.g., "text message") or any of several other wireless radio options that are known to those familiar in the art. Additionally, it should be noted that a variety of embodiments include a wired connection for transmitting data using the electronic assembly.

Although specific examples of companion animal health monitoring systems are described with respect to FIG. 1 and collars with respect to FIG. 4, any of a variety of systems, including those that are utilized with animals other than dogs and those that utilize alternative sensors for determining biometric data regarding the animal, can be utilized in accordance with embodiments of the invention.

Electronic Assemblies

Figure 2:
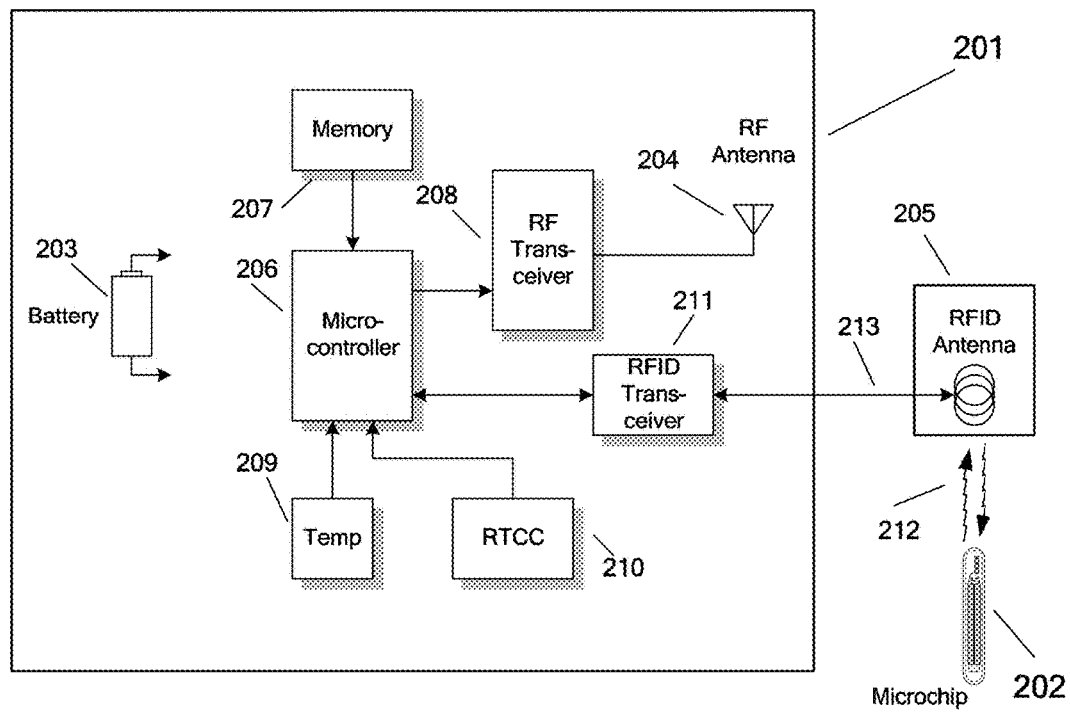
FIG. 2 is a conceptual illustration of the content of the electronic assembly in accordance with an embodiment of the invention.

Turning now to FIG. 2, a conceptual illustration of the content of an electronic assembly 201 is shown. This electronic assembly 201 can powered from battery 203, and is designed to remain predominantly in a very low power consuming dormant state except when scanning the microchip 202 and when transmitting identification and temperature data. However, it should be noted that any power source, including capacitors and energy harvesting devices, can be utilized as appropriate to the requirements of specific applications of embodiments of the invention. Any form of energy harvesting device, such as devices that generate energy based on the movement of the companion animal, the collar, solar power, heat generated by the animal, inductive charging coils, and any other energy source can be utilized as appropriate to the requirements of specific applications of embodiments of the invention. In particular, inductive charging coils can be included in a hermetically-sealed housing containing the electronic assembly 201. These hermetically-sealed housings can be advantageous in a variety of environments, such as a shelter where the electronic assembly 201 is utilized on a variety of animals. In a variety of embodiments, the inductive charging coils include the RF antenna 204, although the inductive charging coils can include a separate antenna as appropriate to the requirements of specific applications of embodiments of the invention. Additionally, the energy-harvesting devices can be located external to the electronic assembly 201, such as on the collar of the companion animal, and connected to the electronic assembly via wired and/or wireless connections as appropriate to the requirements of specific applications of embodiments of the invention.

Microcontroller 206 can be programmed (e.g. with firmware code) that supervises the functions and behavior of the electronic assembly 201. These functions include measuring and/or recording a variety of data using any of a variety of sensors and devices, including but not limited to real time clock/calendar (RTCC) 210, environmental temperature sensor 209, memory 207, radio frequency (RF) transceiver 208, RF antenna 204, and RFID transceiver 211. Microcontroller 206 can be programmed using a number of devices, such as scanning tools and smartphones executing a user application, to scan microchip 202 for data at periodic intervals, such as once per hour, every five minutes, twice daily, or any interval of user interest. Microcontroller 206 can emerge from its normally dormant state and executes the functions pertinent to data reporting on demand and/or during the defined intervals as appropriate to the requirements of specific applications of embodiments of the invention.

Figure 3:
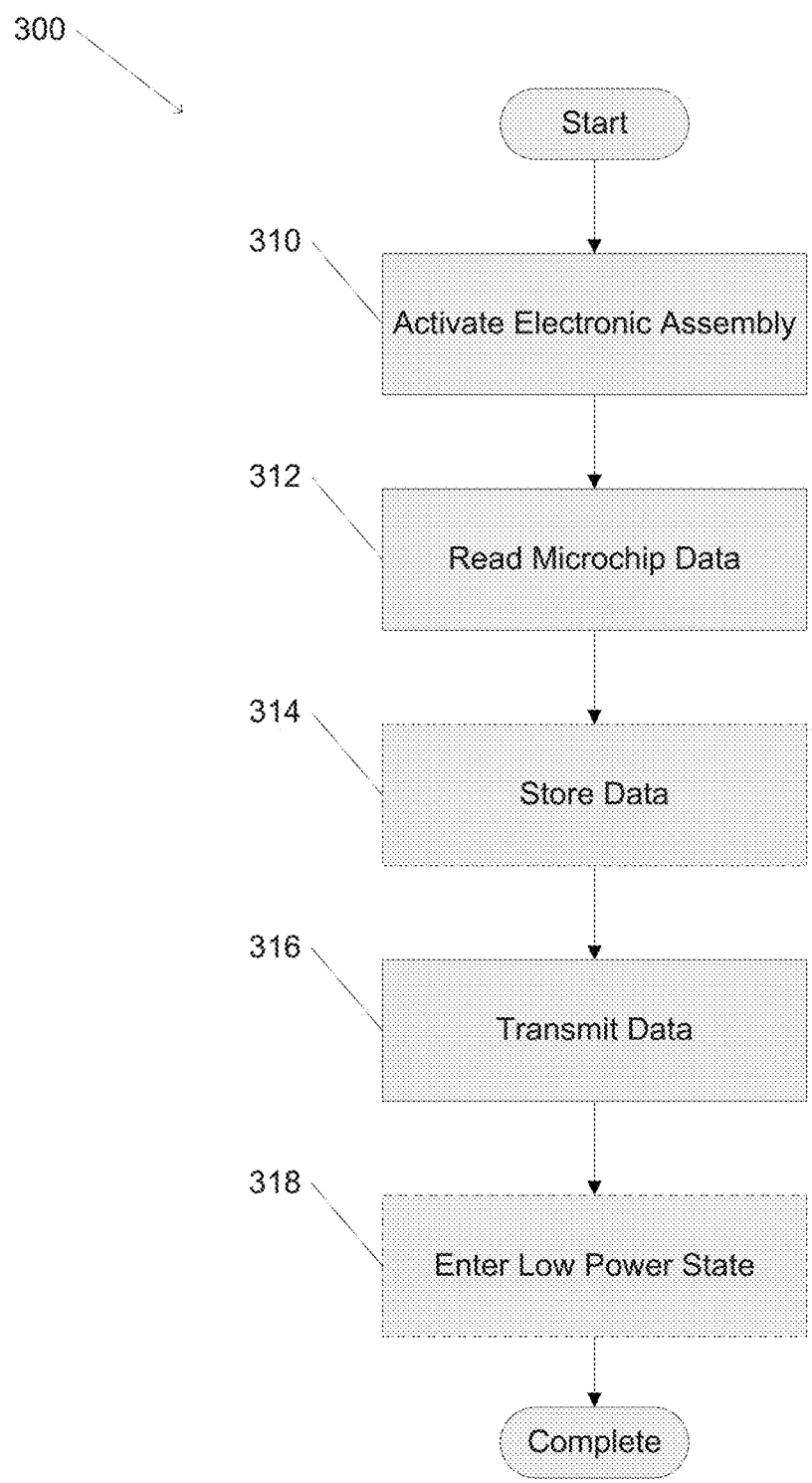
FIG. 3 is a flowchart illustrating a process for reading and transmitting data in accordance with an embodiment of the invention.

A process for measuring and providing data using the electronic assembly is shown in FIG. 3. The process 300 includes activating (310) an electronic assembly, reading (312) microchip data, and in many embodiments storing (314) data. Data is transmitted (316) and, in several embodiments, the electronic assembly and/or microchip enters (318) a low power state. However, any of a variety of processes can be utilized to obtain and transmit data regarding the animal as appropriate to the requirements of specific applications of embodiments of the invention.

For example, upon wakeup, the microcontroller 206 activates RFID transceiver 211 which sends an activation signal to RFID antenna 205 via connecting cable 213. This activation signal causes RFID antenna 205 to emit a magnetic field 212 which in turn inductively powers microchip 202. In several embodiments, the operating frequency for the microchip 202 is between 120 KHz and 150 KHz, with 134.2 KHz being commonly utilized, although any frequency can be utilized as appropriate to the requirements of specific applications of embodiments of the invention. In many embodiments, the microcontroller automatically identifies a frequency for communication with the microchip utilizing any of a variety of RFID automatic tuning techniques as appropriate to the requirements of specific applications of embodiments of the invention. In a number of embodiments, automatic frequency identification can be performed by supplying power to the microcontroller reading the microchip, monitoring the power supplied, storing data related to the monitored power supplied, emitting a signal from an antenna, filtering the harmonic of such signal, outputting the phase signal to a processor and adjusting capacitors based on the phase signal and monitored current. A variety of automatic tuning readers that can be utilized in accordance with embodiments of the invention are disclosed in U.S. Pat. No. 8,219,053, titled "Automatic Tuning Reader" and issued Jul. 10, 2012, the disclosure of which is hereby incorporated by reference in its entirety. In several embodiments, the reading frequency (i.e. excitation frequency) of the microchip 202 is fixed and the microcontroller 206 adjusts the resonance capacitance based on the antenna inductance which depends on the geometry of the collar at the precise moment of reading the microchip 202. In a variety of embodiments, the microcontroller monitors the antenna inductance and/or the deviation from resonance of the antenna and adjusts tuning capacitors to bring the antenna closer to resonance frequency, thereby improving the reading distance and reading reliability of the microchip 202. In many embodiments, the electronic assembly switches capacitors are in and out of the antenna circuit to optimize the tuning to resonance based on an assessment of the microchip signal's phase, amplitude, or power consumption.

Microchip 202 returns a signal to the microcontroller via RFID antenna 205, connecting cable 213, and RFID transceiver 211, where the signal includes identification and/or temperature data. Microcontroller 206 creates a data record consisting of the identification and temperature data acquired from microchip 202, current time and date information acquired from RTCC 210, and local environmental temperature data acquired from temperature sensor 209, and stores this composite data record in memory 207. Microcontroller 206 then activates RF transmitter 208 and establishes a connection with a remote device (e.g. a smartphone or scan tool) using RF antenna 204. Once this connection is established, microcontroller 206 transmits captured data stored in memory 207. Other stored data that are not indicated as having been previously transmitted can also be sent as appropriate to the requirements of specific applications of embodiments of the invention. Once data record conveyance has occurred and confirmed, microcontroller 206 places the electronic assembly 201 in a low power dormant state, and awaits countdown to the next activation event. It should be noted that the data can be transmitted to any device, such as a base station or data server system, as appropriate to the requirements of specific applications of embodiments of the invention.

By capturing and conveying data records that include identification and temperature data, multiple animals can be tracked and monitored. The time/date and environmental temperature data sent from electronic assembly 201 can be used to develop temperature profiles via user application algorithms that in turn provide alerts to the pet owner when the animal temperature deviates from a normal or user specified temperature range. In many embodiments, this data can be transmitted to a base station located in an automobile and describes the condition of the companion animal while left in the vehicle. This can allow for alerts to be generated if the conditions in the vehicle pose a risk to the companion animal, such as overheating in the summer and hypothermia in the winter.

Electronic assembly 201 can further be equipped with additional physiological sensors that could, for example, provide indications of other animal characteristics and behavior, such as pulse rate and activity (motion). Such physiological sensors could also be integrated into microchip 202 and the appropriate data obtained from the microchip. Additionally, electronic assembly 201 can be packaged in combination with other electronic functions such as a training collar that provides guidance to the animal in response to input obtained from a remote control, a Global Positioning System (GPS) tracking locator radio providing location data regarding the location of the animal, and any other electronic function as appropriate to the requirements of specific applications of embodiments of the invention. In many embodiments, the electronic assembly can include a radio-frequency transceiver, such as a Bluetooth transceiver, that can communicate with location beacons, such as, but not limited to, Bluetooth Low Energy beacons. When the electronic assembly is within range of the location beacon, the appropriate data for the location beacon (such as a beacon identifier, time data, and/or another data as appropriate to the requirements of specific applications of embodiments of the invention) can be received using the radio frequency transceiver and utilized to determine the location of the electronic assembly 201.

In a variety of embodiments, these sensors can be located external to the electronic assembly 201 and communicate with the electronic assembly 201 via wired and/or wireless means. For example, a companion animal activity sensor can be utilized to measure the activity of the companion animal and the measured activity data can be transmitted to the electronic assembly 201. The activity data can include, distance traveled, direction information, barking activity (or other appropriate noise-based measurements of the companion animal), time at rest, heart rate, and any other data as appropriate to the requirements of specific applications of embodiments of the invention.

Although specific examples of electronic assemblies are described with respect to FIG. 2, any of a variety of systems, including those utilizing additional sensors for determining biometric data regarding the animal, can be utilized in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An animal health monitoring system, comprising:
    an electronic assembly located on a companion animal, comprising:
        a microprocessor;
        a power source connected to the microprocessor; and
        a transceiver; and
    a microchip implanted in the companion animal and comprising:
        memory storing identification data; and
        a temperature sensor measuring the temperature of the companion animal;
    wherein the electronic assembly:
        activates and interrogates the microchip to obtain identification data and temperature data; and
        transmits the identification data and the temperature data.

2. The animal health monitoring system of claim 1, wherein the power source comprises a battery.

3. The animal health monitoring system of claim 1, wherein the electronic assembly transmits the identification data and the temperature data to a cellular telephone.

4. The animal health monitoring system of claim 3, wherein the electronic assembly transmits the identification data and the temperature data in response to a request received from the cellular telephone.

5. The animal health monitoring system of claim 3, wherein the electronic assembly transmits the identification data and the temperature data based on a pre-determined schedule.

6. The animal health monitoring system of claim 1, wherein:
    the electronic assembly further comprises an RFID transceiver; and
    the electronic assembly interrogates the microchip using the RFID transceiver.

7. The animal health monitoring system of claim 6, wherein the electronic assembly further dynamically adjusts a resonance capacitance of an antenna based on a frequency for interrogating the microchip using the RFID transceiver.

8. The animal health monitoring system of claim 1, wherein:
    the electronic assembly further comprises a memory; and
    the electronic assembly stores the obtained data using the memory.

9. The animal health monitoring system of claim 1, wherein the electronic assembly further comprises a real time clock capable of determining time data.

10. The animal health monitoring system of claim 9, wherein the electronic assembly further:
    obtains time data using the real time clock; and
    transmits the time data.

11. The animal health monitoring system of claim 9, wherein the electronic assembly further transmits the data based on the time data obtained using the real time clock.

12. The animal health monitoring system of claim 1, wherein the electronic assembly is integrated into a collar worn by the animal.

13. The animal health monitoring system of claim 1, wherein:
    the electronic assembly further comprises a Global Positioning System (GPS) receiver capable of generating location data; and
    the electronic assembly further transmits the location data.

14. The animal health monitoring system of claim 1, wherein:
    the electronic assembly further comprises an environmental temperature sensor; and
    the electronic assembly further:
        obtains environmental temperature data using the environmental temperature sensor; and
        transmits the environmental temperature data.

15. The animal health monitoring system of claim 1, wherein the electronic assembly is further connected to an antenna.

16. The animal health monitoring system of claim 15, wherein:
    the antenna is integrated into a collar worn by the companion animal; and
    the electronic assembly comprises a connector that connects to the antenna.

17. The animal health monitoring system of claim 15, wherein the antenna comprises a ferrite core solenoid-form antenna.

18. The animal health monitoring system of claim 15, wherein the microchip is implanted in the animal such that it is located within a threshold distance from the antenna when the collar is fitted on the companion animal.

19. The animal health monitoring system of claim 1, wherein the electronic assembly transmits the data using a Bluetooth connection.

20. The animal health monitoring system of claim 1, wherein the electronic assembly transmits the data using a cellular connection.

\* \* \* \* \*